United States Patent [19]
Centis

[11] Patent Number: 5,617,885
[45] Date of Patent: Apr. 8, 1997

[54] WASHING MACHINE WITH WATER RECOVERY ARRANGEMENT

[75] Inventor: Giovanni Centis, Fontanafredda, Italy

[73] Assignee: Electrolux Zanussi Elettrodomestici S.p.A., Pordenone, Italy

[21] Appl. No.: 391,581

[22] Filed: Feb. 21, 1995

[30] Foreign Application Priority Data

Feb. 25, 1994 [IT] Italy .................. PN94A0011

[51] Int. Cl.$^6$ .................................................. B08B 13/00
[52] U.S. Cl. .................... 134/58 D; 134/57 D; 134/111; 68/207; 68/902
[58] Field of Search .......................... 68/207, 902, 17 R, 68/208; 134/57 D, 58 D, 111, 102.3

[56] References Cited

U.S. PATENT DOCUMENTS

| | | | |
|---|---|---|---|
| 1,296,823 | 3/1919 | Lehmann | 69/208 |
| 2,287,927 | 6/1942 | Altorfer | 68/902 |
| 2,588,774 | 3/1952 | Smith | 68/208 |
| 2,809,650 | 10/1957 | Anderson | 68/208 |
| 3,027,908 | 4/1962 | Cochran | 68/208 |
| 5,241,843 | 9/1993 | Hein | 68/3 R |
| 5,285,665 | 2/1994 | Hetrick, Jr. | 68/208 |
| 5,307,650 | 5/1994 | Mertz | 68/208 |

FOREIGN PATENT DOCUMENTS

| | | | |
|---|---|---|---|
| 227112 | 8/1943 | France | 68/902 |
| 1128390 | 4/1962 | Germany | 68/208 |

*Primary Examiner*—Frankie L. Stinson
*Attorney, Agent, or Firm*—Pearne, Gordon, McCoy & Granger

[57] ABSTRACT

A dishwashing machine having a wash tank (1) arranged to be supplied with fresh supply water through an appropriate water supply circuit (8-14). The machine is adapted to perform operational cycles including a washing phase and at least one rinsing phase. A water recovery system (14, 15) is provided to store in a reservoir (11) water from the last rinse for re-using during a subsequent washing cycle. The reservoir (11) is a part of the water supply circuit (8-14) so that the reservoir is capable of being flushed by the fresh water delivered into the tank (1,4) when the supply circuit is opened.

4 Claims, 2 Drawing Sheets

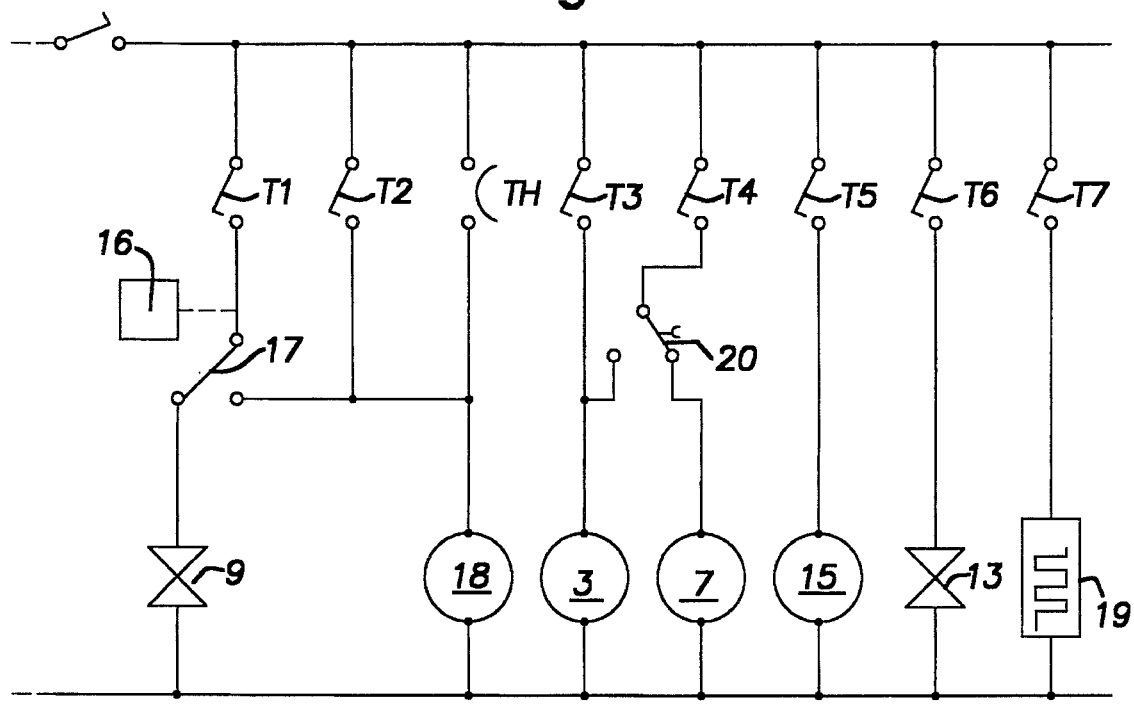

WASHING MACHINE WITH WATER RECOVERY ARRANGEMENT

BACKGROUND OF THE INVENTION

The present invention relates to a washing machine, in particular a dishwashing machine, adapted to reclaim water used in at least one operational step or phase of a washing process.

As shown in patent specifications as EPO 0 287 990 and Germany 29 10 140 clothes washing machines are known in which water from a rinse phase is collected in an appropriate reservoir. The reservoir is connected in parallel with the washing machine for reuse of the water in a pre-wash or main wash phase of a subsequent washing process.

U.S. Pat. No. 4,810,306 further discloses an industrial-type dishwashing machine in which part of the water used for washing and all of the water used for rinsing is collected and stored in a reservoir. The so formed mixture is then used for a subsequent washing cycle.

Such arrangements are effective in bringing about an appreciable energy saving effect, but share the drawback that the rinse and/or wash water stored in the reservoir is at least partially contaminated, i.e., polluted. As a consequence, over time, the reservoir can be subject to heavy sedimentation or scaling to an unacceptable extent. In addition, a likely formation and build-up of molds, fungi and/or bacteria may affect the hygienic condition of the dishwashing machine.

SUMMARY OF THE INVENTION

It is therefore an object of the present invention to provide a washing machine equipped with an effective water recovery arrangement that is substantially free of the above cited hygienic and scale-formation problems.

According to the present invention, this object is achieved by a washing machine with a water recovery arrangement provided with the features and the characteristics as described below and recited in the appended claims.

BRIEF DESCRIPTION OF THE DRAWINGS

The characteristics and advantages of the present invention will become more apparent from the description that is given below by way of non-limiting example with reference to the accompanying drawings in which:

FIG. 2 is a view of an electrical circuit arranged to ensure programmable switching of main operational parts of the washing machine shown in FIG. 1; and FIG. 3 is a diagram illustrating operations of the circuit shown in FIG. 2.

DETAILED DESCRIPTION OF THE PREFERRED EMBODIMENTS

Figure 1:
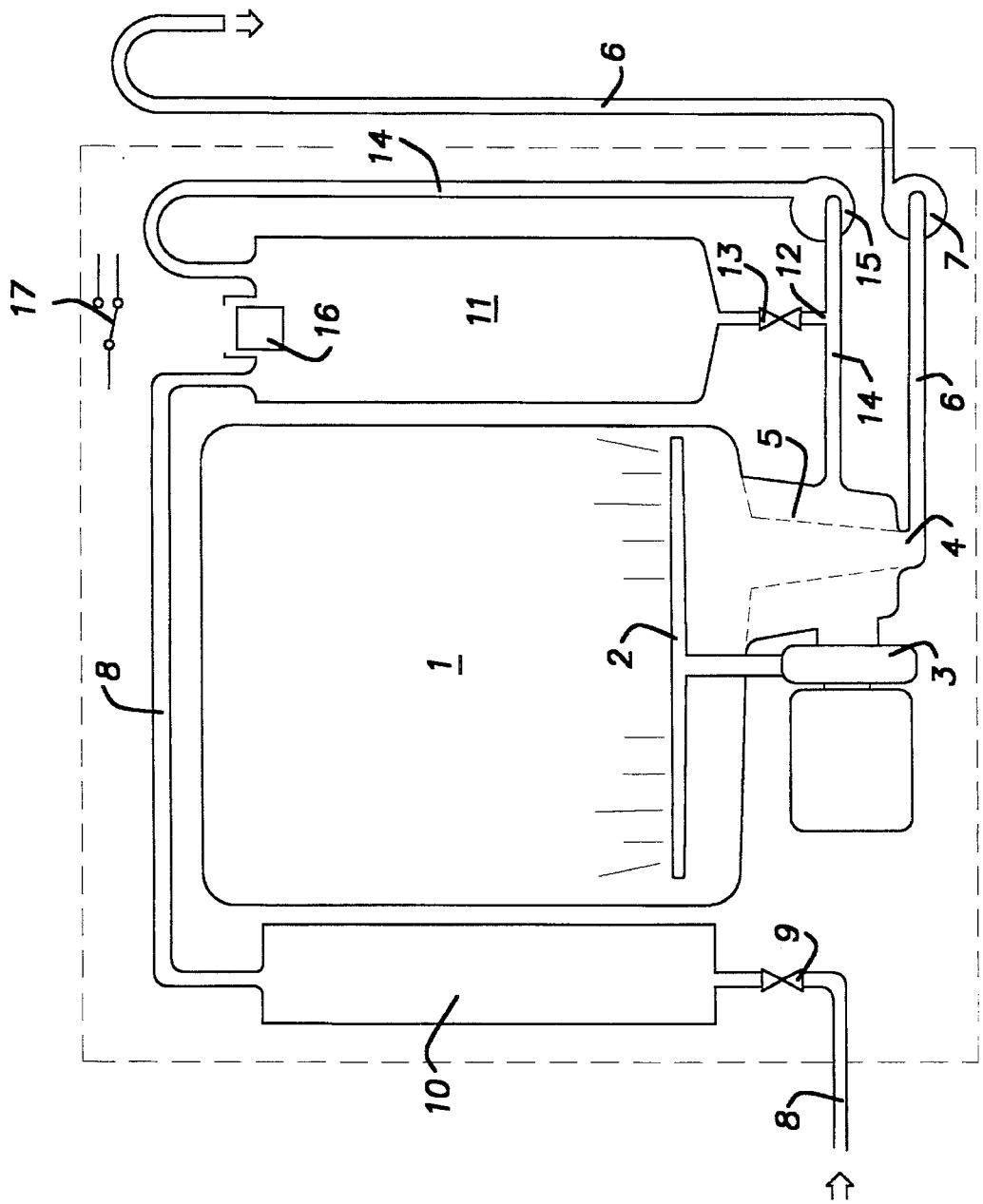
FIG. 1 is a schematical view of a preferred embodiment of a washing machine according to the present invention.

With reference in particular to FIG. 1, a washing machine, preferably a dishwashing machine, includes a washing tank 1 having a collecting sump 4. At least one rotating spray arm 2 in the tank 1 is supplied by a circulating pump 3 with water being taken in from said sump 4 through a filter 5. In a traditional manner, a portion of the sump 4 situated upstream of the filter 5 is connected with a pipe 6 in communication with a drain pump 7.

A conduit 14 branches off from the sump 4, preferably from a portion thereof situated downstream of the filter 5. Said conduit 14 is provided with a recovery pump 15 and communicates with a reservoir 11. According to one feature of the present invention, said reservoir 11 is arranged to act as a volumetric metering reservoir and is adapted to receive fresh supply water through an appropriate supply conduit 8. The supply conduit 8 is provided with a normally closed solenoid controlled water inlet valve 9 and a water softener 10. The bottom of the reservoir 11 communicates with the inside of the tank 1 through a pipe 12 provided with a normally closed, solenoid controlled or similar valve means 13. In a preferred manner, the pipe 12 connects with the conduit 14 downstream of the valve 13 and upstream of the recovery pump 15. The supply conduit 8, inlet valve 9, softener 10, reservoir 11, pipe 12, valve 13, and conduit 14 define a water supply circuit adapted to supply water to the tank 1 and sump 4. The water supply circuit is opened and closed by operation of the valves 9, 13.

The reservoir 11 is preferably provided with level control means, which may for instance comprise a float 16 adapted to enable the water inlet valve 9 to be opened only when the level of the water in the reservoir 11 is below a predetermined L.

As illustrated schematically in FIG. 2 by way of example, the float 16 is adapted to actuate a switch 17 (which may also be a commutator) arranged to deliver a power supply to the inlet valve 9 through another switch T1 that is controlled by a program control unit of the machine. In a known manner, said program control unit can comprise a timer 18 adapted to drive a set of cams (not shown) which in turn control a series of electrical switches T1–T7. The switch T2, which is connected in parallel with a thermostatic switch Th, controls the operation of the timer 18. The switches T3–T7 are respectively adapted to control the operation of the circulation pump 3, the drain pump 7, the recovery pump 15, the valve 13 and a heating element 19 provided to heat up the water collected in the sump 4.

The operation of the circuit shown in FIG. 2 is illustrated in the diagram shown in FIG. 3. The operation is substantially traditional and will not be described in detail here. According to a selected program, each operational cycle of the corresponding process will include at least one washing phase and/or at least one rinsing phase, during which the circulating pump 3 will supply the rotating spray arm 2 with the water that collects in the sump 4.

Each one of said operational phases starts with only the water inlet valve 9 opening, so that the conduit 8 supplies the reservoir 11 with fresh water until the predetermined level L is reached. At this point, the valve 13 is opened so that the water volume collected in the metering reservoir 11 flows by gravity into the sump 4 through the pipe 12 and the conduit 14.

Usually, at the end of such operational phases (which are carried out in a traditional way, possibly including heating of the water by the heating element 19), the pump 7 is operated the water collected in the sump 4 to the drain through the pipe 6.

However, at the end of at least one of such operational phases, preferably at the end of the last rinse phase, the drain pump 7 is not operated. That is, the drain pump 7 is kept de-energized, and the recovery pump 15 is operated instead. The rinse water collected in the sump 4 is therefore delivered, through the conduit 14, to the reservoir 11, where it is then stored for re-use during the first operational phase of a subsequent washing process. If required, fresh water from the supply can be added to the recovered rinse water until the level L is reached in the reservoir 11. As described in the references previously cited, for instance, the rinse water stored in the reservoir 11 can be used in a subsequent washing process as pre-wash or wash water, depending on the program selected. It will of course be appreciated that the selection of the phases of both recovery and subsequent reuse of the water may vary according to actual needs and does not limit the scope of the present invention.

Since the reservoir 11 is a part of the water supply circuit 8–14 (in which the reservoir 11 is connected in series), the reservoir 11 is automatically flushed, and washed, with fresh water from the supply, as are the valve 13 and the conduits 12 and 14, during each water inlet phase occurring after a water recovery phase carried out by operating the pump 15. This enables the water from at least one operational phase of the washing process to be recovered in an effective way, while overcoming the hygienic and reliability problems associated with prior-art solutions. In this connection, it should be noticed that the conduit 14 connects with the sump 4 downstream of the filter 5. In an advantageous manner, this enables only filtered water, and therefore water that is substantially free of soil particles, to be recovered and temporarily stored in the reservoir 11.

It will be appreciated that the above described washing machine may undergo a number of modifications without departing from the scope of the present invention.

For instance, the pumps 7 and 15 may be replaced by a single pump and appropriate flow diverting means adapted for delivering the water from the sump 4 to either the drain 6 or the reservoir 11.

Furthermore, as illustrated in FIG. 2, the washing machine can include a manually operated commutator or similar switch 20. When set in a normal resting position (as shown in FIG. 2), said commutator switch 20 connects the switch T5 to the drive motor of the recovery pump 15, which is therefore enabled to operate in the previously described manner, as controlled by the program control unit of the machine.

The commutator switch 20 can be switched over to an operational setting in which it de-energizes the recovery pump 15 and connects the switch T5 to the drive motor of the drain pump 7 instead. Therefore, the previously described phase in which the rinse water is stored in the reservoir 11 is thereby changed into a normal water drain phase, during which the pump 7 is operated, thereby preventing contaminated water from being stored in the reservoir 11. This is particularly advantageous when the dishwashing machine is operated for the last time before an expected period of non-use thereby preventing contaminated water from being stored in the reservoir 11 under conditions which may well become hygienically undesirable during said long period of non-use.

What is claimed is:

1. A washing machine having a water recovery arrangement, comprising:

a wash tank;

a normally closed water supply circuit for supplying fresh water to the wash tank;

program control means for controlling the water supply circuit to perform operating cycles; and a volumetric metering reservoir for storing water from one of the operating cycles for re-use during a subsequent one of the operating cycles, wherein said volumetric metering reservoir (11) is a part of the water supply circuit (8–14) and is substantially filled and flushed by a volume of the fresh water each time the water supply circuit is opened, and wherein after the volumetric metering reservoir is filled with the volume of the fresh water, the water supply circuit provides the wash tank with the volume of the fresh water.

2. A washing machine according to claim 1, further comprising:

a conduit;

a pump controlled by said program control means, said conduit and pump being in communication for delivering water from the wash tank into said volumetric metering reservoir; and valve means (13) controlled by the program control means (T6), said valve means being in communication with the volumetric metering reservoir (11) and said conduit (14) upstream of said pump (15).

3. A washing machine according to claim 1, further comprising:

water filtering means disposed within the wash tank;

drain means connected with the wash tank upstream of said water filtering means;

a pump controlled by the program control means; and a conduit in communication with the pump to deliver water from the wash tank into said volumetric metering reservoir, wherein the conduit branches off the wash tank (1,4) downstream of said water filtering means (5).

4. A washing machine according to claim 1, wherein said program control means (T1–T7) is comprised of switching means (20) adapted to be actuated between a normal setting and an operative setting in which the water recovery arrangement (11, 14, 15) is operative and inoperative, respectively.

* * * * *